United States Patent
Casone et al.

(10) Patent No.: US 10,320,474 B2
(45) Date of Patent: Jun. 11, 2019

(54) SYSTEM, METHOD AND ARTICLE FOR ADAPTIVE FRAMING FOR TDMA MAC PROTOCOLS

(71) Applicant: STMicroelectronics S.r.l., Agrate Brianza (IT)

(72) Inventors: Luca Casone, S. Cesario di Lecce (IT); Danilo Blasi, Monteroni di Lecce (IT); Andrea Piglione, Ivrea (IT); Emile Saccani, Aosta (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 133 days.

(21) Appl. No.: 15/394,277

(22) Filed: Dec. 29, 2016

(65) Prior Publication Data

US 2018/0191429 A1    Jul. 5, 2018

(51) Int. Cl.
| | |
|---|---|
| *H04B 7/26* | (2006.01) |
| *H04J 3/02* | (2006.01) |
| *H04J 3/06* | (2006.01) |
| *H04L 12/70* | (2013.01) |
| *H04B 3/54* | (2006.01) |

(52) U.S. Cl.
CPC ........... *H04B 7/2656* (2013.01); *H04B 3/542* (2013.01); *H04B 3/544* (2013.01); *H04J 3/025* (2013.01); *H04J 3/0652* (2013.01); *H04L 47/00* (2013.01); *H04B 2203/5433* (2013.01)

(58) Field of Classification Search
CPC ... H04J 3/0655; H04W 48/08; H04W 56/001; H04W 72/0446; H04W 84/18; H04W 52/0216; H04W 28/26; H04W 48/16; H04W 56/002; H04W 72/0406; H04W 56/0005; H04W 56/0075; H04W 84/10; H04W 92/18; Y02D 70/22; Y02D 70/162
See application file for complete search history.

(56) References Cited

U.S. PATENT DOCUMENTS

| | | | |
|---|---|---|---|
| 2007/0104215 A1* | 5/2007 | Wang | ...................... H04L 45/02 370/458 |
| 2009/0323669 A1* | 12/2009 | Salonidis | .............. H04J 3/0655 370/350 |
| 2010/0226359 A1 | 9/2010 | van der Wateren et al. | |

(Continued)

FOREIGN PATENT DOCUMENTS

WO     2009/126242 A1    10/2009

OTHER PUBLICATIONS

International Search Report and Written Opinion, dated Sep. 20, 2017, for International Application No. PCT/IB2017/053644, 11 pages.

(Continued)

*Primary Examiner* — Awet Haile
(74) *Attorney, Agent, or Firm* — Seed IP Law Group LLP

(57) ABSTRACT

A device includes an interface and Time Division Multiple Access (TDMA) Medium Access Control (MAC) circuitry coupled to the interface. The TDMA MAC circuitry detects a beacon in a frame having a defined frame duration and determines a frame compensation value based on a start time of the frame, a reference start time of the frame, and a number of elapsed frames. A current frame duration value is determined based on the frame compensation value and the defined frame duration.

25 Claims, 6 Drawing Sheets

(56) References Cited

U.S. PATENT DOCUMENTS

2010/0271971 A1* 10/2010 Koo ..................... H04W 24/10
370/252
2016/0127515 A1* 5/2016 Kim ........................ H04L 69/18
370/254

OTHER PUBLICATIONS

"Specification for PoweRline Intelligent Metering Evolution," Prime Alliance, R1.3.6.1, 254 pages.
"Specification for PoweRline Intelligent Metering Evolution," Prime Alliance, R1.4 Ed. Rev. 1, draft, 349 pages.
G3-PLC, "About G3-PLC Technology," 2016, retrieved on Nov. 28, 2016, retrieved from http://www.g3-plc.com/home/, 3 pages.
Meters and More, "Meters and More Open Technologies," 2016, retrieved on Nov. 28, 2016, retrieved from http://www.metersandmore.com/, 3 pages.
Prime, "Prime Alliance, Interoperable Standard for Advanced Meter Management & Smart Grid," 2013, retrieved on Nov. 28, 2016, retrieved from http://www.prime-alliance.org/, 2 pages.

* cited by examiner

SYSTEM, METHOD AND ARTICLE FOR ADAPTIVE FRAMING FOR TDMA MAC PROTOCOLS

BACKGROUND

Technical Field

The present description relates to systems, methods and articles for adaptive framing for Time-Division Multiple Access (TDMA) Medium Access Control (MAC) protocols, either wired or wireless, single or multi hops.

Description of the Related Art

Time-Division Multiple Access (TDMA) Medium Access Control (MAC) protocols may be employed in wired or wireless networks, and may be configured as single or multi hops networks.

For example, powerline networks are wired networks having data packets which travel on cables used to transport electricity. Generally, powerline networks may be classified into two classes: indoor networks, which typically implement local area networks (LANs), usually at high bit rates for content distribution within, for example, a house; and outdoor networks, which typically implement wide area networks (WANs), usually at lower bit rates than LAN powerline networks, to transport application data related to power consumption and usage.

A power distribution grid coupled with a powerline WAN may be referred to as a smart grid. A smart grid may use the data transmitted to, for example, improve the efficiency of power generation and distribution, automatic meter reading (AMR), etc. In AMR, a low bit rate application is typically employed in which a central data aggregator periodically requests remote meters to report the power consumed until that moment. Communication protocols have been defined to support WANs, including protocols supporting powerline WANS such as PoweRline Intelligent Metering Evolution (PRIME) networks, G3 and Meters and More protocols.

BRIEF SUMMARY

In an embodiment, a device comprises: an interface, which, in operation, receives a data stream of a network; and Time Division Multiple Access (TDMA) Medium Access Control (MAC) circuitry, coupled to the interface, wherein the TDMA MAC circuitry, in operation: detects a beacon packet in a frame of the data stream, wherein a frame is a period of time having a defined frame duration; determines a frame compensation value based on a start time of the frame, a reference start time of the frame, and a number of elapsed frames; and determines a current frame duration value based on the determined frame compensation value and the defined frame duration. In an embodiment, the TDMA MAC circuitry, in operation, determines the frame compensation value by applying a filter based on the number of elapsed frames. In an embodiment, the TDMA MAC circuitry, in operation, selects a filter parameter based on the number of elapsed frames. In an embodiment, the TDMA MAC circuitry, in operation, determines a sample compensation value based on the start time of the frame, the reference start time and the number of elapsed frames and determines the frame compensation value by applying the filter to the sample compensation value. In an embodiment, the TDMA MAC circuitry, in operation: determines the reference start time of the frame based on a start time of a previous frame in which a beacon was detected, the defined frame duration and the number of elapsed frames. In an embodiment, the number of elapsed frames is a number of frames elapsed since a frame in which a previous beacon was detected. In an embodiment, the TDMA MAC circuitry, in operation, controls transmission of a beacon at a transmission time based on the current frame duration value. In an embodiment, the beacon is transmitted by a switch node or a coordinator of the network.

In an embodiment, a method comprises: detecting, by a node of a Time Division Multiple Access (TDMA) network, a beacon transmitted in a frame, wherein a frame is a period of time having a defined frame duration; determining, by the node, a frame compensation value based on a start time of the frame, a reference start time of the frame, and a number of elapsed frames; and determining, by the node, a current frame duration value based on the frame compensation value and the defined frame duration. In an embodiment, the method comprises determining the frame compensation value by applying a filter based on the number of elapsed frames. In an embodiment, the method comprises selecting a filter parameter based on the number of elapsed frames. In an embodiment, the method comprises: determining a sample compensation value based on the start time of the frame, the reference start time, and the number of elapsed frames; and applying the filter to the sample compensation value. In an embodiment, the method comprises determining the reference start time of the frame based on a start time of a previous frame in which a beacon was detected, the defined frame duration and the number of elapsed frames. In an embodiment, the number of elapsed frames is a number of frames elapsed since a frame in which a previous beacon was detected. In an embodiment, the method comprises controlling, by the node, a transmission time of a beacon based on the current frame duration value. In an embodiment, the beacon is transmitted by a switch node or a coordinator of the TDMA network.

In an embodiment, a system, comprises: node data processing circuitry, which, in operation, generates data related to a node; and Time Division Multiple Access (TDMA) Medium Access Control (MAC) circuitry, coupled to the node circuitry, wherein the TDMA MAC circuitry, in operation: detects a beacon in a TDMA frame, wherein a frame is a period of time having a defined frame duration; determines a frame compensation value based on a start time of the frame, a reference start time of the frame, and a number of elapsed frames; and determines a current frame duration value based on the frame compensation value and the defined frame duration. In an embodiment, the TDMA MAC circuitry, in operation, determines the frame compensation value by applying a filter based on the number of elapsed frames. In an embodiment, the TDMA MAC circuitry, in operation, controls transmission of a beacon at a transmission time based on the current frame duration value. In an embodiment, the system comprises an integrated circuit including the TDMA MAC circuitry. In an embodiment, the integrated circuit includes the node data processing circuitry. In an embodiment, the TDMA MAC circuitry, in operation, implements a PoweRLine Intellegent Metering Evolution (PRIME) network protocol.

In an embodiment, a non-transitory computer-readable medium has contents which cause a node of a Time Division Multiple Access (TDMA) network to perform a method, the method comprising: detecting a beacon in a frame, wherein a frame is a period of time having a defined frame duration; determining a frame compensation value based on a start time of the frame, a reference start time of the frame, and a number of elapsed frames; and determining a current frame duration value based on the frame compensation value and the defined frame duration. In an embodiment, the contents comprise instructions executed by processing circuitry of the node. In an embodiment, the method comprises controlling a transmission time of a beacon by the node based on the current frame duration value.

DETAILED DESCRIPTION

Figure 1:
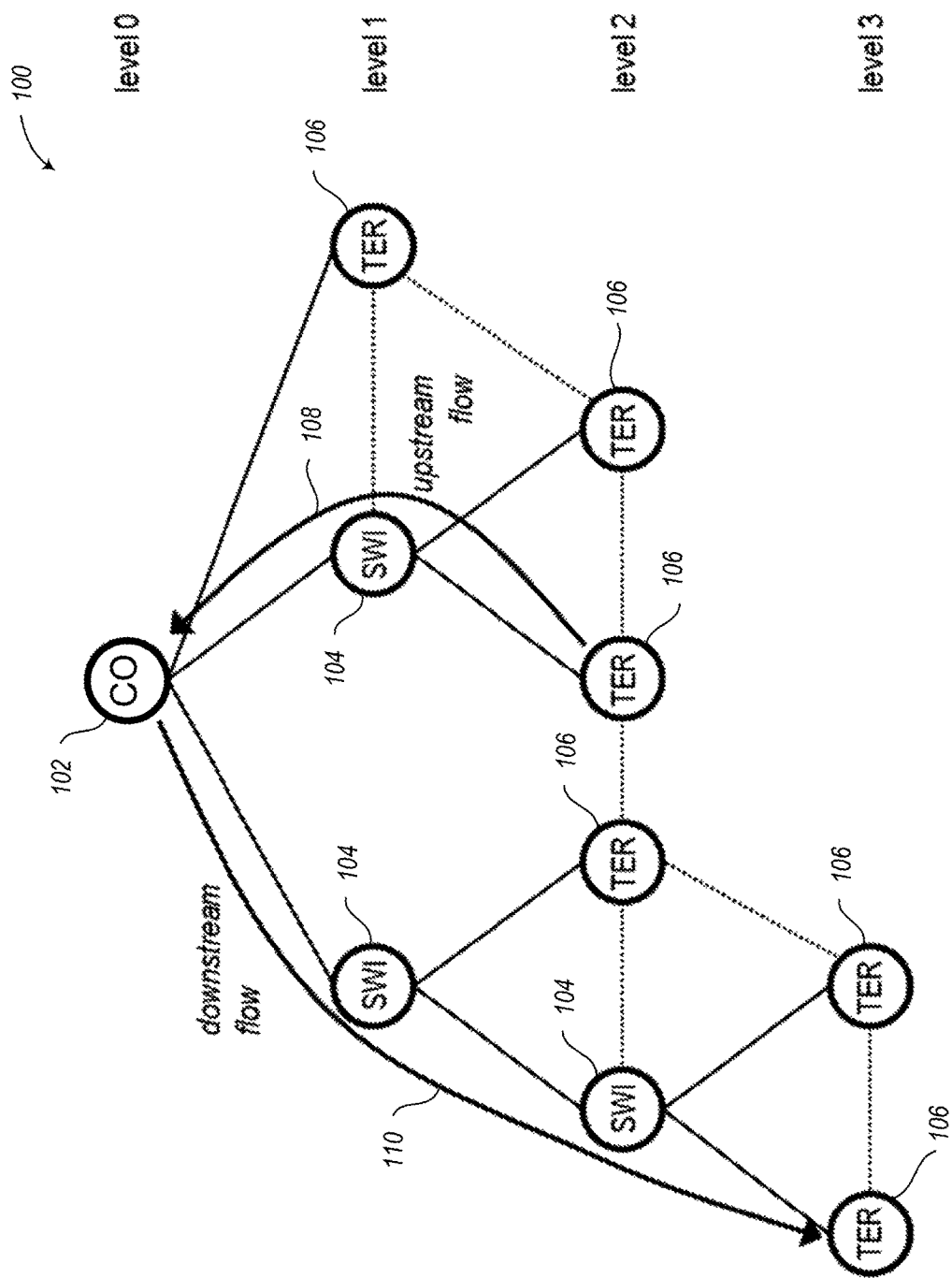
FIG. 1 is a functional block diagram of time division multiple access (TDMA) network according to an embodiment.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, switches, computing systems, communication networks, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not necessarily drawn to scale, and some of these elements may be enlarged and positioned to improve drawing legibility. Further, the particular shapes of the elements as drawn are not necessarily intended to convey any information regarding the actual shape of particular elements, and have been selected solely for ease of recognition in the drawings.

An embodiment of an adaptive framing method is described with reference to a TDMA network, either wired or wireless, where nodes are logically organized in a tree shaped hierarchy.

In a tree-shaped network, every node has a single parent (switch) through which the node can communicate with other nodes within the network. The network is traversed by chains (tree branches) of such switches that together form the network backbone. Data and control packets flow through the tree branches from sources to destinations. Generally, data and control packets travel from source nodes to the tree's root node (coordinator) and from the tree's root node to destination nodes in the tree. In some configurations, the root node is replaced by the first switch in the path common to both source and destination. In such a network, nodes are logically organized as a hierarchical tree. In a particular configuration of an embodiment, such a tree may collapse into a star, with all nodes receiving beacons from just another node.

Generally, every switch (including the root node, which is also a switch) provides time synchronization to child nodes of the switch. A switch receives time synchronization from the switch's parent switch and forwards the time synchronization to the switch's child nodes. Such synchronization usually relies on device node internal clocks. Packets exchanged are used to align clocks, which are then used by device nodes to keep track of time. Clocks, however, are not perfect and synchronization may be lost from time-to-time. For that reason, usually some countermeasures are put in place to avoid clocks drifting too much. If not so, network synchronization may be lost. The loss of network synchronization leads to instability and network performance degradation.

An embodiment of a synchronization method facilitates providing a robust time synchronization procedure for a network employing a TDMA MAC protocol. An embodiment facilitates avoiding the need to implement more complex countermeasures. In an embodiment, a receiver-method is employed which facilitates each receiver node maintaining time synchronization with the synchronization of the node's parent. In an embodiment, the method is compliant with any TDMA MAC protocol of the network. Providing a robust time synchronization procedure increases network stability. In an embodiment, a robust time synchronization may be implemented using software, which may reduce the cost of implementation of an embodiment. Embodiments may be employed in single-hop networks (e.g., star-shaped mentioned above), or multi-hop networks (e.g., tree-shaped mentioned above), and both types of networks may benefit from a more robust time synchronization procedure. In an embodiment, improvement in synchronization is facilitated without employing specific synchronization information exchanges in addition to beacons.

For example, PRIME is a protocol operating at a data link layer of an International Organization for Standardization/Open Systems Interconnection (ISO/OSI) stack architecture and provides multi-hop power-line communication over a self-organizing packet-switched network of Service Nodes (SN) controlled by a central Base Node (BN). Two versions of PRIME are currently employed, version 1.3.6 and a newer version 1.4. While the versions differ in various aspects, the MAC sub-layers of both versions of PRIME have a network-wide Time Division Multiple Access (TDMA) policy, and a tree-shaped organization. An embodiment facilitates addressing time-synchronization control issues that may arise, for example, from these characteristics of the PRIME protocols.

The TDMA class of MAC protocols assumes that: all nodes in the network share a knowledge of time; time is divided in intervals of a known or knowable length, often called frames; and nodes have access to the transmission medium at determined time slots within a frame.

Time division control information that helps nodes to establish how and when to access the transmission medium, such as the structure of a frame, time information, etc., may be communicated to nodes in various ways under TDMA protocols. For example, a signal external to the network (e.g., an external pilot signal such as a Global Positioning Signal (GPS) pilot signal) may be employed. In another example, a device within the network may send out-of-band signals or special packets to provide the time division information. Various combinations of signals may be employed.

In TDMA networks here addressed, the tree root node periodically broadcasts beacons. Each beacon packet reports the structure of a frame and other time information that help receiving nodes to establish when and how to access the transmission medium to receive from or transmit to other nodes.

TDMA protocols are generally designed to manage transmissions in one-hop networks (star-shaped said above), where all nodes can receive packets from and send packets to a central coordinator. But to facilitate covering long distance among nodes or to allow far away nodes to join the network (when for instance nodes are fixed and hence cannot be moved), TDMA protocols may be configured to support multi-hop, tree-shaped networks.

In TDMA networks, the coordinator transmits beacons with a fixed frequency, typically one beacon per frame. Nodes directly attached to the coordinator receive its beacons and register with it as "terminals". Further, nodes directly connected to terminals do not hear the coordinator's beacons, but may announce their presence to terminals connected to the coordinator. The terminals directly connected to coordinator may request to be promoted to switches. Once a terminal has been promoted to a switch by the coordinator, the switch starts transmitting its own beacons. New terminals may attach themselves to the child nodes of the said switches, and the process may repeat, forming a switch at N-hops distance from the coordinator, with N greater than 1.

FIG. 1 illustrates an example network 100. At level 0, there is a single coordinator CO 102. At level 1 are devices directly connected to the coordinator CO 102. As illustrated, there are two switches SWI 104 and one terminal TER 106 connected to the coordinator 102 of the network 100 at level 1. At level 2 are devices directly connected to one of the switches SWI 104 at level 1. As illustrated, one switch SWI 104 and three terminals TER 106 are connected to the network 100 at level 2. At level 3 are devices directly connected to the switch SWI 104 at level 2. As illustrated, two terminals TER 106 are connected to the network 100 at level 3. The network 100 of FIG. 1 has a tree-shaped hierarchy of nodes. The coordinator CO 102 is the root node, switches SWI 104 are the intermediate nodes and terminals TER 106 are the leaves. As illustrated in FIG. 1, solid lines represent branches of the tree and dotted lines represent other links between nodes. Examples of data and control packets flows are illustrated, including a flow upstream from terminals TER 106 and switch nodes SWI 104 to the coordinator CO 102 on multi-hop paths formed by branches of the tree, for example on upstream path 108, and a flow downstream from the coordinator CO 102 to switch nodes SWI 104 and terminals 106 on multi-hop paths formed by branches of the tree, for example on downstream path 110. The hop-wise distance of a switch node SWI 104 to the coordinator CO 102 is the level of a switch, assuming the coordinator CO 102 is at level 0.

Figure 2:
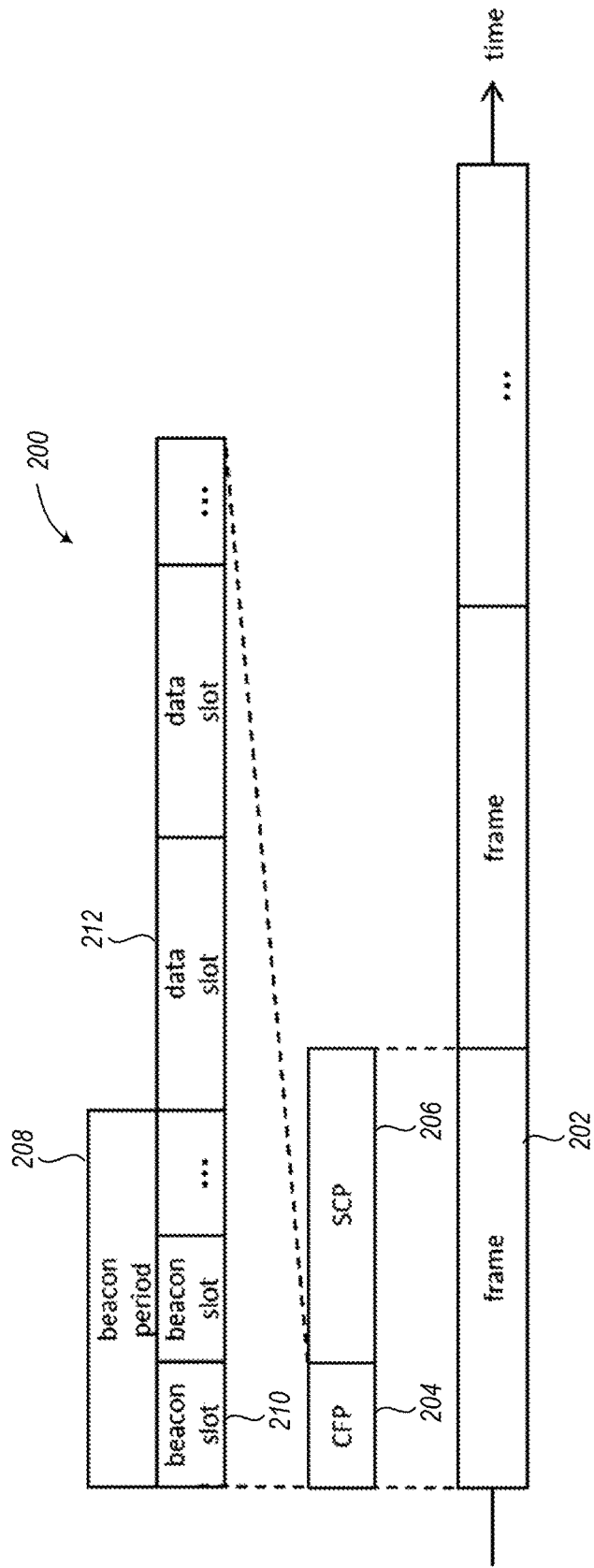
FIG. 2 illustrates a generic structure of frames of a TDMA network according to an embodiment.

The source of the network-wide synchronization is the coordinator CO 102, which periodically sends beacons. The beacons inform directly attached nodes (e.g., nodes at level 1), about the start and end time of the current frame and the structure of the current frame. FIG. 2 illustrates an example embodiment of a sequence of frames 200. As illustrated in FIG. 2, the frame sequence 200 comprises a plurality of frames 202. Each frame 202 is divided into two sub-periods in which packets of defined packet types may be transmitted or defined protocol operations may be performed, a contention free period 204 and a shared contention period 206.

The contention free period 204 is dedicated to transmissions explicitly authorized by the coordinator and which source and time duration is known by every node which may be potentially interested in it, so that just one node transmits in that time period and the likelihood that a packet is correctly received is increased. Generally speaking, in the contention free period 204 a beacon period 208 may be reserved and divided into multiple beacon slots 210, where beacons may be transmitted by either the coordinator (see coordinator CO 102 of FIG. 1) or switches (see switches SWI 104 in FIG. 1). Without lack of generality, the beacon period 208 in other TDMA MAC protocols may be distinguished from the contention free period 204 in the frame 202.

The shared contention period SCP 206 may typically be used for transmission of data and control packets according to a carrier sense multiple access (CSMA) scheme, which regulates potentially concurrent transmissions of multiple nodes contending for the use of the transmission medium. In practice, CSMA schemes may reduce the risk of destructive interference between overlapping transmissions, but do not eliminate the risk of interference.

The beacon transmitted by the coordinator CO 102 typically indicates the frame structure in terms of beacon slots 210 and data slots 212 and timings to the various nodes of the network. To distribute the information throughout the network, each switch 104 repeats the beacon received from a parent switch in a beacon slot 210 assigned to the switch 104 by the coordinator 102 according to a transmission schedule set by the coordinator 102 (e.g., every eighth frame). To facilitate avoiding collisions and network instability issues, the coordinator 102 assigns different beacon slots to switches which are directly connected to each other (which may thus hear each other's beacons), and the beacon slots 210 do not overlap. When collisions occur, a node does not receive a beacon from its parent. Occasional beacons lost do not typically result in network instability (a node can miss an occasional beacon), however, if collisions are frequent such that a node misses several beacons (e.g. if coordinator badly allocates beacons from different switches or switches which have lost synchronization misallocate their beacons, hence making them overlap to those being transmitted by other switches in nearby slots), the node may ultimately become disconnected from the network. If the node is a switch, the entire subtree below the switch may become disconnected from the network.

To virtually increase the room allocated to beacons, switches may be instructed to send beacons at a lower frequency than one beacon per frame. In some embodiments, the frequency may be as low as once per super-frame (e.g., once every 32 frames in some protocols). This allows beacon slots to be assigned to multiple switches which are not transmitting in the same frame. Beacon slots also may be assigned to multiple switches which are not directly connected to each other.

Figure 5:
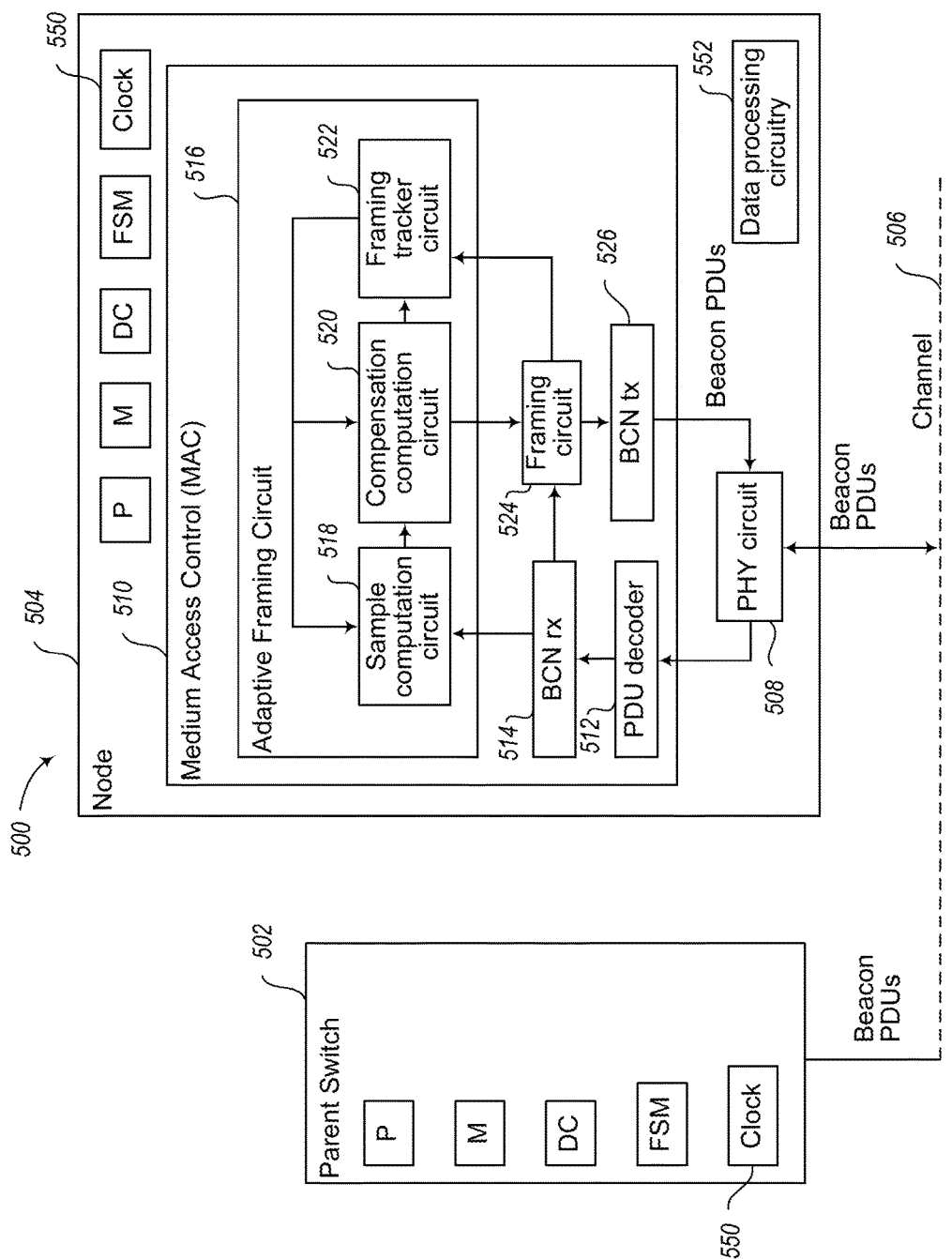
FIG. 5 illustrates an embodiment of a network having a node employing an embodiment of an adaptive frame algorithm.

Each network device, such as a switch 104 in the network 100, typically has an internal clock (see FIG. 5). Each switch relies on beacons received from its parent switch and the switch's internal clock to determine the timing of placement of packets on the channel in accordance with the instructions received from the coordinator, and thus to determine the placement of the beacons the switch transmits onto the channel. The beacons are placed at the beginning of the assigned slot or as close as possible to the beginning of the assigned slot. A switch keeps track of the time elapsed since the beginning of a frame using its internal clock to place the switch's beacon in an assigned slot.

In addition, clock skew, which is the difference in time shown by the clocks of different nodes of a network, can be a significant problem in time-dependent networks like TDMA networks. Moreover, clock errors in different devices of a network are usually different, and the impact of errors in a tree branch may be cumulative. For example, a switch several hops from the coordinator may be significantly out-of-synchronization with the timing of the coordinator.

Thus, the accuracy of the placement of a switch's beacon depends on the accuracy of the switch's internal clock and the clock's synchronization with other clocks of the network. Inaccurate placement of a beacon increases the likelihood of collisions. As discussed above, collisions can lead to missed beacons which can lead to portions or even all of a network becoming disconnected. Constructing (or reconstructing) a network can be a time and resource expensive process. As discussed above, each node must be registered and promotion procedures employed to designate switch nodes.

As said, countermeasures may be employed to reduce the likelihood of collisions and the resulting network instability, and thus to reduce the need to reconstruct a network. Small errors in beacon position can be addressed somewhat through the use of guard intervals to separate nearby beacon transmissions. The synchronization among the clocks of the network devices may be addressed somewhat through the exchange of information between devices to restore alignment.

Figure 3:
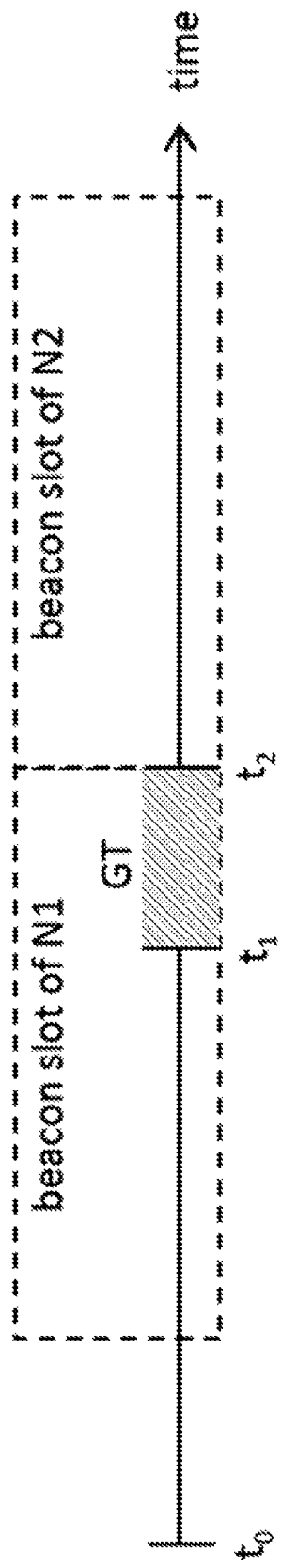
FIG. 3 illustrates guard times separating consecutive beacons.

Usage of guard intervals, however, may be not enough to keep collisions from happening. FIG. 3 illustrates a possible placement of guard time into beacon slot 210. As illustrated, the beacon transmissions of two switches N1 and N2 do not overlap if the transmission of a beacon by switch N1 ends at a time $t_1$ in the beacon slot of switch N1 before the start of a beacon transmission by switch N2 in the beacon slot of switch N2 at time $t_2$. If the guard time GT is defined as the ideal gap between two consecutive beacon transmissions, the following relationship may be defined:

$$GT = t_2 - t_1 \quad (1)$$

Due to internal clock error, which may be represented as e and be expressed in parts-per-million ppm (1 ppm=$10^{-6}$), the time measured by a node differs from the true value of time according to:

$$t' = t(1+e) \quad (2)$$

Thus, GT depends on the times actually measured by switches N1 and N2, so that Equation 1 can be rewritten as follows:

$$GT = t'_2 - t'_1 = t_2(1+e_2) - t_1(1+e_1) \quad (3)$$

If the time period T is the period of time that has to pass before the guard time GT is insufficient to prevent overlap, the following relationship may be expressed:

$$T + t_0 = t_1 = t_2 \quad (4)$$

Assuming $t_0$ is equal to zero, without loss of generality, the expression of Equation 3 may be rewritten as:

$$GT = t'_2 - t'_1 = t_2(1+e_2) - t_1(1+e_1) = T((1+e_2) - (1+e_1)) = T(e_2 - e_1) \quad (5)$$

By applying actual TDMA MAC protocol characteristics of an embodiment, it is possible to find T values and hence configurations where the guard time is not sufficient to protect beacon transmissions. As an example, here the PRIME MAC protocol for powerline communications is taken. PRIME uses Orthogonal Frequency-Division Multiplexing (OFDM) symbols. In PRIME version 1.4, the guard time GT is one OFDM symbol, and $e_2 - e_1 \leq 100$ ppm, thus, from Equation 5:

$$T = GT/(e_2 - e_1) \geq 10000 \text{ OFDM symbols} \quad (6)$$

The frame length $T_{frame}$ in PRIME can change as follows:

$$T_{frame} = T_{frame}(n) = n(276 \text{ OFDM symbols}), n = \{1, 2, 3, 4\} \quad (7)$$

Thus, T can be expressed in terms of a number of frames:

$$T = T(n) \geq (10000 \text{ symbols}/T_{frame}(n)) \approx (36/n) \text{frames} \quad (8)$$

In the absence of reception failures, the lowest beacon transmission frequency is one beacon every super-frame (in PRIME 1.4, 32 frames). This puts an upper limit on the value of T:

$$T \leq 32 \text{ frames} \quad (9)$$

If the limit is exceeded, the guard time GT may be insufficient to prevent overlap between two interfering switches, and eventual resulting loss of synchronization. Combining Equations 8 and 9, it follows that:

$$32 \geq 36/n, \text{ that is to say } n \geq 1.125 \quad (10)$$

Thus, a guard time GT of 1 OFDM symbols is insufficient to protect against a worst case clock drift in cases of 276*2=552 OFDM symbol frame length. In addition, because beacons may be lost due to channel errors, scenarios employing low beacon transmission frequencies would likely face network stability issues even with the presence of guard times.

Errors in time tracking by network nodes may severely impact network performance. In an embodiment, no explicit time information is contained in beacon packets, so that nodes must rely on beacon reception times to maintain synchronization among them. In an embodiment, a protocol specification-compliant adaptive framing method is employed to maintain synchronization between nodes of a network. In an embodiment, the method is executed by nodes (e.g., switches and terminals) of the network, which may, for example, be service nodes, and does not need to be executed by the coordinator of the network. In an embodiment, each node evaluates its time tracking difference with respect to the node's parent node. In an embodiment, a node adapts its time knowledge in terms of frame duration to the frame duration of its parent node. In an embodiment, the adaptation is refreshed with every received beacon. In view of the delivery of synchronization from the coordinator to all the nodes, an embodiment facilitates automatically and gradually reducing time tracking differences between nodes, starting from the nodes directly attached to the coordinator, to the terminals farthest from the base node.

Figure 4:
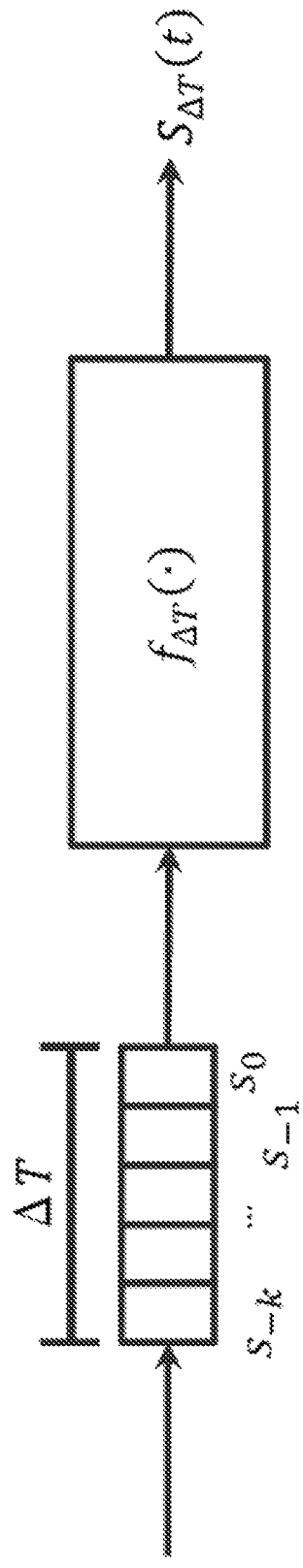
FIG. 4 illustrates an embodiment of a method of an adaptive framing.

In an embodiment, the difference calculation adapts to the amount of information available. FIG. 4 is a simplified representation of an adaptive framing algorithm according to an embodiment. In FIG. 4, $f_{AT}(\bullet)$ represents the adaptive framing, which provides as an output a difference estimation $S_{AT}(t)$ at any time t determined based on samples collected in a time window t−ΔT. As illustrated in FIG. 4, $s_0$, $s_{-1}, \ldots s_{-k}$ represent the collected time difference samples, from the most recent to the least recent sample, where:

$t_{-l}$ is the collection time of the sample $s_{-l}$ and $$t_0 - t_{-k} \leq \Delta T < t_0 - t_{-k-1}.$$

The amount of information corresponds to the number of samples the adaptive framing algorithm collects in the time window. For a given window length, the number of samples depends on how many beacons the node receives from its parent node in the time window. The node samples the time difference in response to reception of a beacon from the node's parent node. The number of beacons received may vary based on channel conditions (e.g., reception errors which may reduce the number of beacons received) and the network configuration (e.g., a beacon transmission frequency set lower than one beacon per frame), which may vary. Thus, the amount of samples collected may vary between a small number of samples, to a large number of samples. In an embodiment, an adaptive framing algorithm adapts to changing numbers of samples in a time window.

FIG. 5 illustrates a portion of an embodiment of a network 500 including a parent switch 502 (or coordinator) and an embodiment of a node 504 employing adaptive framing.

As illustrated, the parent switch 502 and the node 504 each include circuitry such as one or more processors P, one or more memories M, one or more discrete circuits DC (e.g., floating point circuitry, barrel shifters, etc.) and one or more finite state machines FSM, which may be used alone or in various combinations to implement the respective functions and operations of the parent switch 502 and of the node 504, such as those functions and operations discussed herein. The parent switch 502 and the node 504 each also include their own clock 550, which is used, inter alia, to track the passage of time.

In operation, the parent switch 502 sends a beacon packet or beacon Protocol Data Unit (PDU) over a channel 506 (e.g., a wireless or wired channel, such as a power line) to the node 504. A Physical Layer (PHY) module or circuitry 508 (e.g., an interface) in the node 504 decodes the signal and extracts the beacon PDU from the signal. The physical layer circuitry 508 passes the extracted PDU to a Medium Access Control (MAC) module or circuitry 510. A PDU decoder module or circuit 512 decodes the PDU and recognizes (detects) the PDU as a beacon transmitted by the parent switch 502 of the node 504. The decoded PDU beacon is provided to a beacon receiving module or circuit BCN rx 514, which determines the reception time of the frame including the PDU beacon and provides the reception time to an adaptive framing algorithm (AFA) module or circuit 516 (as illustrated, to a sample computation module or circuit 518 of the AFA circuit 516).

As illustrated, the AFA circuit 516 comprises the sample computation circuit 518, a compensation computation module or circuit 520, and a framing tracker module or circuit 522. The sample computation circuit 518 determines a difference between a determined reception time of a frame and an expected reception time of a frame based on the determined reception time and a frame tracking signal generated by the frame tracker circuit 522. The compensation computation circuit 520 determines a frame compensation value to adjust the framing, which is provided to a framing module or circuit 524, and generates an indication that a new beacon has been received from the parent switch 502, and provides the indication that a new beacon has been received to the framing tracker circuit 522. The framing tracker circuit 522 keeps track of how many frames have been traversed, for example, based on the indication from the compensation computation circuit 520 that a new beacon has been received and a signal from the framing circuit that a new frame is being entered, and provides the information regarding how many frames have been traversed to the sample computation circuit 518 and the compensation computation circuit 520.

As mentioned above, the compensation computation circuit 520 determines a frame compensation value which is provided to a framing circuit 524 of the MAC circuit 510. The most recent frame compensation value is used by the framing circuit 524 to determine the current frame duration value of the node 504. For example, the framing circuit 524 adjusts a frame duration defined in a protocol specification based on the frame compensation value to obtain a current frame duration value of the node 504. In another embodiment, the process is iterative. For example, a previous frame duration value of the node 504 may be adjusted based on the most recent frame compensation value.

The reception time of a frame may be determined based on the reception time of the beacon and the position of the beacon within the frame (the position of the beacon within the frame may be indicated by the beacon itself). The ending time of the frame, and of frames which follow the frame before the next beacon is received from the parent switch 502, may be determined by adding the current frame duration value to the start time of the frame. This facilitates correcting the frame duration used by the node 504 to match the frame duration used by the parent switch 502 (for example, to compensate for clock skew differences), even when a beacon is not received in every frame.

Node 504 as illustrated also comprises data processing circuitry 552, which, in operation, may generate data for transmission on the network 500, such as metering data or other data related to services provided by the node, or employ data received on the network 500 to control services provided by the node, such as power distribution services and related devices, etc.

The node 504 may also be a switch in the network 500, and if so, the node 504 sends beacons to its child nodes, for example, in frames according to a frequency set by the network coordinator (see coordinator CO 102 of FIG. 1). The beacon transmission module or circuit BCN tx 526 uses frame boundaries determined based on the current frame duration value to determine the transmission time of beacons by the node 504 to its child nodes. For example, the coordinator instructs each switch (e.g., via control information included in the beacons transmitted by the coordinator and repeated by the intervening switches or via other control packets exchanged when the node is promoted to switch) when to transmit a beacon as a displacement (in OFDM symbols, time units, or whatever used metric) from a beginning of a frame in which the beacon is to be transmitted by the switch. Adjusting the frame boundaries based on the current frame duration value automatically changes the frame start time of the node 504 to match the frame start time of the parent switch 502, which also adjusts the beacon transmission time by the node 504. This facilitates maintaining network synchronization with all the nodes of the network 500, as each node (e.g., node 504) adjusts its frame boundaries to match the frame boundaries of its parent node (e.g., parent switch 502).

While FIG. 5 illustrates various modules or circuits of the node 504 as separate components for ease of illustration, the various circuits may be combined or separated in various embodiments. For example, all or part of the functionality of the sample computation circuit 518 may be performed by the compensation computation circuit 520 in some embodiments, etc.

Figure 6:
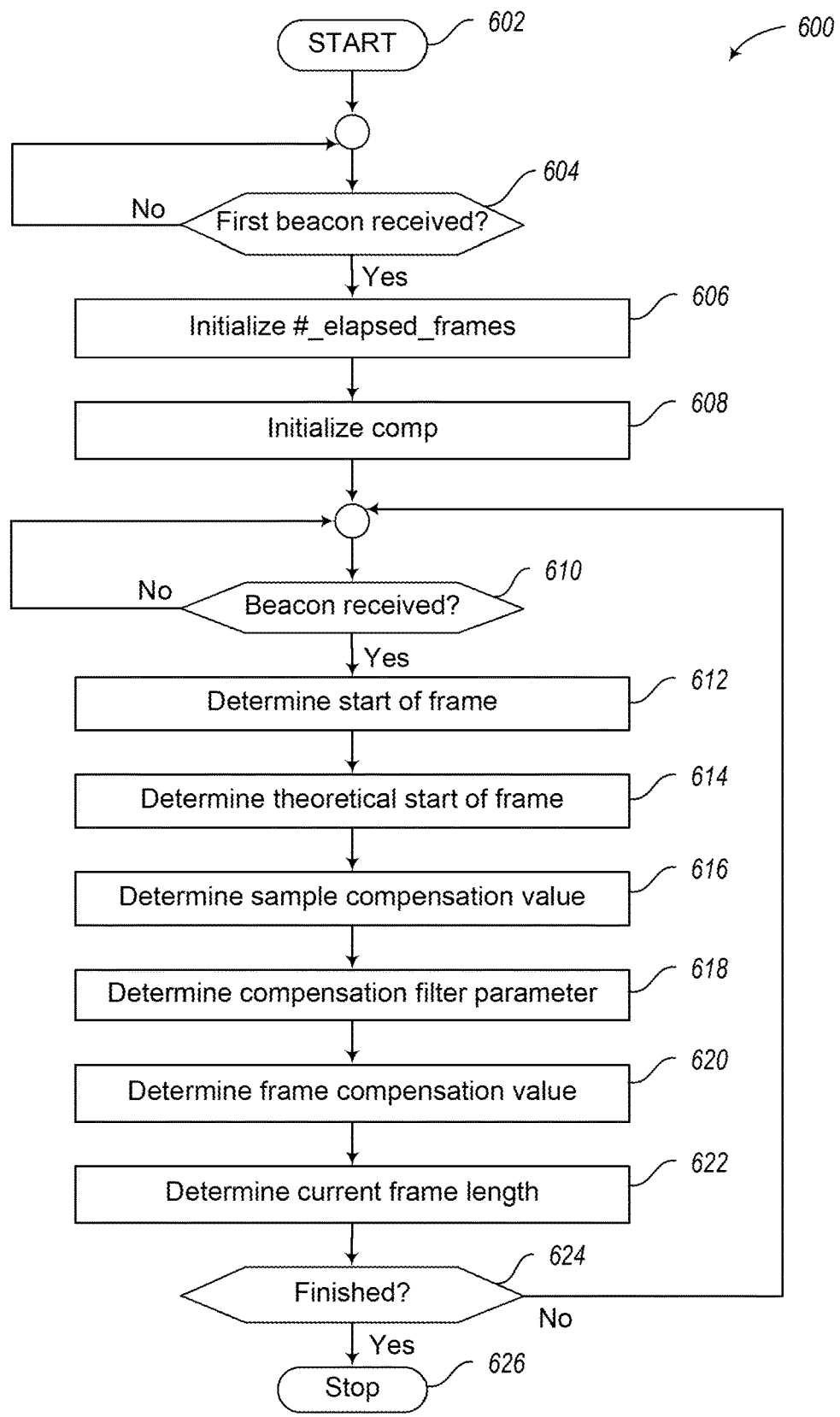
FIG. 6 illustrates an embodiment of a method of adaptive framing.

FIG. 6 illustrates an embodiment of a method or subroutine 600 of adaptive framing, which may be employed, for example, by the nodes of FIG. 1 (e.g., switches 104 and terminals 106), or by the node 504 of FIG. 5. For convenience, the method 600 of FIG. 6 will be described with reference to the network 500 of FIG. 5.

The method 600 starts at 602. The method 600 may start, for example, as soon as node 504 is registered with the network 500 (e.g., the node 504 is associated with the parent switch 502, and the node 504 is set up to receive and process beacons).

The method 600 proceeds from 602 to 604. At 604 through 608, the node 504 initializes the method 600. At 604, the node 504 determines whether a first beacon is received in a frame. For example, in a connection between the node 504 and its parent switch 502, while time goes by with multiple frames, only some of the frames may include a beacon from the parent switch 502. When it is determined at 604 that a first beacon has been received in a frame (e.g., a beacon has been detected in a frame), the method 600 proceeds from 604 to 606. When it is not determined that a first beacon has been received in a frame, the method 600 returns to 604 to determine whether a first beacon is received in the next frame.

At 606, a variable tracking a number of elapsed frames, #_elapsed_frames, is initialized by the node 504. The variable #_elapsed_frames may be, for example, initialized to −1. The method 600 proceeds from 606 to 608. At 608, the node 504 initializes a compensation value, comp, which may be used to adjust the current frame duration employed by the node 504. The compensation value comp, may be, for example, initialized to zero. The method proceeds from 608 to 610.

At 610, the node 504 determines whether a beacon is received in a frame, and thus whether to collect a sample for use in determining a clock compensation value. When it is determined at 610 that a beacon is received in a frame, the method 600 proceeds from 610 to 612. When it is not determined at 610 that a beacon is received in a frame, the method 600 returns to 610 to see if the next frame includes a beacon.

At 612, the node 504 determines the real (measured) start time $SoF_{real}$ of the frame in which the beacon is received. The real start time $SoF_{real}$ of the frame may, for example, be determined based on the following equation:

$$SoF_{real} = bcn\_rx\_time - td\_bcn\_pos, \quad (11)$$

where bcn_rx_time is the time when the beacon is received and td_bcn_pos is the time interval between the start of the frame and the position of the beacon in the frame. The position of the beacon in the frame (expressed in OFDM symbols, time units, or whatever used metric) is included in the beacon. The method 600 proceeds from 612 to 614.

Figure 7:
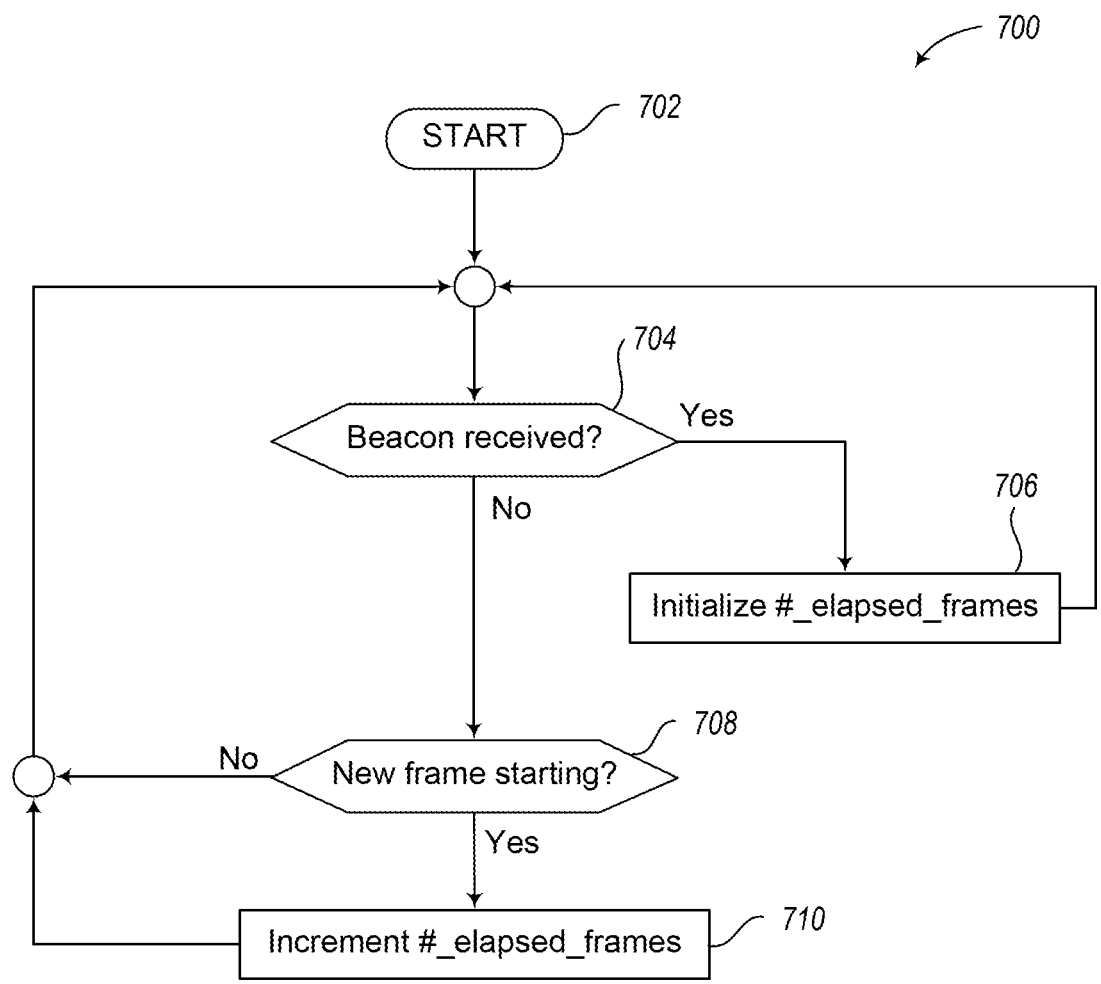
FIG. 7 illustrates an embodiment of a method of tracking a number of elapsed frames.

At 614, the node 504 determines a reference or theoretical start time $SoF_{theo}$ of the frame in which the beacon is received, assuming no clock skew. The reference or theoretical start time $SoF_{theo}$ of the frame may, for example, be determined based on the following equation:

$$SoF_{theo} = SoF_{real}^{(-1)} + T_{frame} \cdot \#\_elapsed\_frames, \quad (12)$$

where $SoF_{real}^{(-1)}$ is the real start time of the previous frame in which a beacon was received, $T_{frame}$ is the length of a frame as defined in the communication protocol, and #_elapsed_frames is a number of frames that have elapsed since the previous frame in which a beacon was received. FIG. 7, discussed in more detail below, illustrates an example embodiment of a method of determining the number of elapsed frames. The method 600 proceeds from 614 to 616.

At 616, the node 504 determines a sample compensation value associated with the received beacon $comp_{sample}$ (a beacon compensation value). The beacon compensation value associated with the received beacon $comp_{sample}$, may be determined, for example, based on the following equation:

$$comp_{sample} = (SoF_{real} - SoF_{theo})/(\#\_elapsed\_frames) \quad (13)$$

The method 600 proceeds from 616 to 618. At 618, the node 504 determines a compensation filter parameter α, which may be a function of the number of elapsed frames #_elapsed_frames. Table 1 illustrates example values of the compensation filter parameter for the number of frames. Other functional relationships between the compensation filter parameter α and the #_elapsed_frames may be employed.

TABLE 1

Example Compensation Filter Parameter Values

| #_elapsed_frames | α |
| --- | --- |
| 1 | ⅛ |
| 2 | ¼ |
| 3 ≤ #_elapsed_frames ≤ 8 | ½ |
| #_elapsed_frames ≥ 9 | 1 |

The method 600 proceeds from 618 to 620. At 620, the node 504 determines a frame compensation value comp, which may be applied to a frame length defined in a protocol specification to obtain a current frame duration value of the node 504. The frame compensation value comp may be determined, for example, according to:

$$comp = (1-\alpha) \cdot comp + \alpha \cdot comp_{sample}. \quad (14)$$

In other embodiments, other filtering mechanisms may be employed, which may require other or different parameters from α above.

The method 600 proceeds from 620 to 622. At 622, the node 504 determines a current frame duration value to be employed by the node 504 based on a frame length defined in the protocol specification and the frame compensation value comp. The method proceeds from 622 to 624.

At 624, the node 504 determines whether it is finished performing adaptive framing. When it is determined at 624 that adaptive framing is finished, the method proceeds from 624 to 626 where the method stops. When it is not determined at 624 that adaptive framing is finished, the method proceeds from 624 to 610 to wait for the next received beacon.

Embodiments of the method 600 may include acts not shown in FIG. 6, may omit acts shown in FIG. 6, and may perform acts shown in FIG. 6 in various orders. For example, an embodiment of a method of determining a number of elapsed frames since the last beacon was received, such as the embodiment illustrated in FIG. 7, may be incorporated into the method 600 in an embodiment.

FIG. 7 illustrates an embodiment of a method or subroutine 700 of determining the number of elapsed frames #_elapsed_frames, since the last beacon sample was received (e.g., since the last beacon was successfully received from the parent switch 502), which may be employed, for example, by the nodes of FIG. 1 (e.g., switches 104 and terminals 106), or by the node 504 of FIG. 5. An embodiment of the method of tracking the number of elapsed frames 700 may be employed, for example, by the method 600 of adaptive framing of FIG. 6. For convenience, the method 700 of FIG. 7 will be described with reference to the network 500 of FIG. 5.

The method 700 starts at 702 and proceeds to 704. At 704, the node 504 determines whether a beacon is received in a current frame. This may be done, for example, by the framing tracker circuit 522 based on a signal generated by the compensation computation circuit to indicate a new beacon has been received from the parent switch 502. When it is determined at 704 that a beacon has been received in the current frame, the method 700 proceeds from 704 to 706. When it is not determined that a beacon has been received in the current frame, the method 700 proceeds to 708.

At 706, a variable tracking a number of elapsed frames, #_elapsed_frames, is initialized by the node 504. The variable #_elapsed_frames may be, for example, initialized to −1. The method 700 proceeds from 706 to 704.

At 708, the node 504 determines whether a new frame is starting. This may be done, for example, based on a signal generated by the framing circuit 524 to indicate a new frame is being entered, for example, based on a signal from the clock 550 and the current frame duration value employed by the node 504. When it is determined at 708 that a new frame is starting, the method proceeds from 708 to 710, where the node 504 increments the number of elapsed frames #_elapsed_frames. The method 700 proceeds from 710 to 704.

Embodiments of the method 700 may include acts not shown in FIG. 7, may omit acts shown in FIG. 7, and may perform acts shown in FIG. 7 in various orders. For example, an embodiment may include acts to determine whether method 700 should stop tracking the number of elapsed frames.

Some examples, with reference to FIG. 5 for convenience, illustrate how the compensation employed by an embodiment of the method 600 of FIG. 6 facilitate accounting for clock skews of a node (e.g., node 504) and the node's parent switch (e.g., parent switch 502) to synchronize the node with the parent switch. The clock skew of the parent switch 502 affects the beacon transmission time and when the beacon itself is received (e.g., bcn_rx_time), and hence the start of the frame measured by the node. The clock skew of the node 504 affects the theoretical frame length (e.g., $T_{frame}$), as well as the measurement of bcn_rx_time.

Equation 13 may be rewritten as follows by substituting from Equation 12:

$$comp_{sample} = ((SoF_{real} - SoF_{real}^{(-1)})/(\#\_elapsed\_frames)) - T_{frame} \quad (15)$$

In a first scenario, both the parent switch's 502 and the node's 504 clocks are accurate. In this case, $SoF_{real} - SoF_{real}^{(-1)}$ is equal to $\#\_elapsed\_frames \cdot T_{frame}$ and $comp_{sample}$ is zero, and (correctly) no compensation is applied.

In a second scenario, the parent switch's 502 clock is accurate, and the node's 504 clock is fast. In this case, $SoF_{real} - SoF_{real}^{(-1)}$ is accurate on an absolute time scale, but it is measured longer than $\#\_elapsed\_frames \cdot T_{frame}$ by the node 504. The compensation sample $comp_{sample}$ is non-zero (positive), and the compensation causes the node 504 to enlarge its time frame (e.g., to increase the current frame duration value). This is correct because the node's 504 clock skew is causing the node 504 to use shorter frame durations than the parent switch 502.

In a third scenario, the parent switch's 502 clock is fast, and the node's 504 clock is accurate. In this case, $SoF_{real} - SoF_{real}^{(-1)}$ is accurate for purposes of the parent switch 502, but it is shorter than $\#\_elapsed\_frames \cdot T_{frame}$ on an absolute time scale, and it is measured as shorter than $\#\_elapsed\_frames \cdot T_{frame}$ by the node 504. $T_{frame}$ is accurate for the node 504 and on the absolute time scale. The compensation sample $comp_{sample}$ is non-zero (negative), and the compensation causes the node 504 to shrink its time frame (e.g., to decrease the current frame duration value) to synchronize with the frame duration of the parent switch. This is correct because the node 504 tunes its behavior to that of the parent switch 502.

In a fourth scenario, the parent switch's 502 clock and the node's 504 clocks are fast with the same skew. In this case, $SoF_{real} - SoF_{real}^{(-1)}$ is accurate for purposes of the parent switch 502, but it is shorter than $\#\_elapsed\_frames \cdot T_{frame}$ on an absolute time scale and it is accurate for purposes of the node 504. $T_{frame}$ is accurate for purposes of the node 504 and is shorter than the theoretical frame time on the absolute time scale. The compensation sample $comp_{sample}$ is zero, and no compensation is applied by the node. This is correct because the node 504 and the parent switch 502 are using the same time knowledge.

In a fifth scenario, the parent switch's 502 clock is fast, and the node's 504 clock is slow. In this case, $SoF_{real} - SoF_{real}^{(-1)}$ is accurate for purposes of the parent switch 502 and it is shorter than $\#\_elapsed\_frames \cdot T_{frame}$ on an absolute time scale and it is even shorter for the node 504. $T_{frame}$ is accurate for the node 504 and is longer than the theoretical frame time on the absolute time scale. The compensation sample $comp_{sample}$ is non-zero (negative), and the node correctly shrinks its frame duration.

In an embodiment of a method of adaptive framing, an exponential moving average has been chosen to update the compensation. This may facilitate: reducing computational time (the operations are not complex); taking the sample history into account without buffering the samples; adjusting the amount of compensation based on the amount of available information; and selecting filtering parameter(s) (e.g., compensation filter parameter α) based on the impact of the computations on the processing speed. A number of factors may be considered when defining the compensation filter parameter(s).

For example, a relatively high number of received beacons indicates there are more samples per unit of time. This may indicate the average as having a high level of confidence. The average may also filter away oscillations which may be more likely when the sampling frequency is higher. Thus, more samples may be required to significantly change the compensation value comp. In this case, lower values may be assigned to the compensation filter parameter α.

In another example, a relatively low number of received beacons indicates there are fewer samples per unit of time. This may indicate the impact of the average should be reduced to facilitate a faster response to changing clock skews. Also, the impact of oscillations may be attenuated when there is more time between samples. In this case, higher values may be assigned to the compensation filter parameter α. Simulations have indicated the values in Table 1, above, work well in an embodiment, and work well with, and without, the use of floating point units, which facilitates the use of adaptive framing in simpler hardware configurations. It is noted that for a compensation filter parameter of ½ (and powers thereof) in an embodiment, the compensation can be implemented by shifting bits. The simulations also show significant improvement in maintaining synchronization in scenarios presenting significant clock skew differences and lost beacons.

Embodiments may be implemented, for example, in TDMA MAC protocols, in multi-hop and single-hop networks, in wired and wireless networks, and facilitate nodes maintaining synchronization without explicit exchanges of temporal information to compensate for clock skew. Embodiments may be implemented just at the reception side, and facilitate a node adjusting its frame length to match the frame length of its parent switch, without the use of special packets containing temporal control information.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

Some embodiments may combine illustrated blocks, circuits or methods, omit illustrated blocks, circuits or methods, include additional blocks, circuits or methods and various combinations thereof. The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
an interface, which, in operation, receives a data stream of a network; and
Time Division Multiple Access (TDMA) Medium Access Control (MAC) circuitry, coupled to the interface, wherein the TDMA MAC circuitry, in operation:
detects a beacon packet in a frame of the data stream, wherein a frame is a period of time having a defined frame duration;
determines a frame compensation value based on a start time of the frame, a reference start time of the frame, and a number of elapsed frames; and
determines a current frame duration value based on the determined frame compensation value and the defined frame duration.

2. The device of claim 1 wherein the TDMA MAC circuitry, in operation, determines the frame compensation value by applying a filter based on the number of elapsed frames.

3. The device of claim 2 wherein the TDMA MAC circuitry, in operation, selects a filter parameter based on the number of elapsed frames.

4. The device of claim 3 wherein the TDMA MAC circuitry, in operation, determines a sample compensation value based on the start time of the frame, the reference start time and the number of elapsed frames and determines the frame compensation value by applying the filter to the sample compensation value.

5. The device of claim 1, wherein the TDMA MAC circuitry, in operation:
determines the reference start time of the frame based on a start time of a previous frame in which a beacon was detected, the defined frame duration and the number of elapsed frames.

6. The device of claim 1 wherein the number of elapsed frames is a number of frames elapsed since a frame in which a previous beacon was detected.

7. The device of claim 1 wherein the TDMA MAC circuitry, in operation, controls transmission of a beacon at a transmission time based on the current frame duration value.

8. The device of claim 1 wherein the beacon is transmitted by a switch node or a coordinator of the network.

9. A method, comprising:
detecting, by a node of a Time Division Multiple Access (TDMA) network, a beacon transmitted in a frame, wherein a frame is a period of time having a defined frame duration;
determining, by the node, a frame compensation value based on a start time of the frame, a reference start time of the frame, and a number of elapsed frames; and
determining, by the node, a current frame duration value based on the frame compensation value and the defined frame duration.

10. The method of claim 9, comprising:
determining the frame compensation value by applying a filter based on the number of elapsed frames.

11. The method of claim 10, comprising:
selecting a filter parameter based on the number of elapsed frames.

12. The method of claim 11, comprising:
determining a sample compensation value based on the start time of the frame, the reference start time, and the number of elapsed frames; and
applying the filter to the sample compensation value.

13. The method of claim 9, comprising:
determining the reference start time of the frame based on a start time of a previous frame in which a beacon was detected, the defined frame duration and the number of elapsed frames.

14. The method of claim 9 wherein the number of elapsed frames is a number of frames elapsed since a frame in which a previous beacon was detected.

15. The method of claim 9, comprising:
controlling, by the node, a transmission time of a beacon based on the current frame duration value.

16. The method of claim 9 wherein the beacon is transmitted by a switch node or a coordinator of the TDMA network.

17. A system, comprising:
node data processing circuitry, which, in operation, generates data related to a node; and
Time Division Multiple Access (TDMA) Medium Access Control (MAC) circuitry, coupled to the node circuitry, wherein the TDMA MAC circuitry, in operation:
detects a beacon in a TDMA frame, wherein a frame is a period of time having a defined frame duration;
determines a frame compensation value based on a start time of the frame, a reference start time of the frame, and a number of elapsed frames; and
determines a current frame duration value based on the frame compensation value and the defined frame duration.

18. The system of claim 17 wherein the TDMA MAC circuitry, in operation, determines the frame compensation value by applying a filter based on the number of elapsed frames.

19. The system of claim 17 wherein the TDMA MAC circuitry, in operation, controls transmission of a beacon at a transmission time based on the current frame duration value.

20. The system of claim 17, comprising:
an integrated circuit including the TDMA MAC circuitry.

21. The system of claim 20 wherein the integrated circuit includes the node data processing circuitry.

22. The system of claim 17 wherein the TDMA MAC circuitry, in operation, implements a PoweRLine Intellegent Metering Evolution (PRIME) network protocol.

23. A non-transitory computer-readable medium having contents which cause a node of a Time Division Multiple Access (TDMA) network to perform a method, the method comprising:
detecting a beacon in a frame, wherein a frame is a period of time having a defined frame duration;
determining a frame compensation value based on a start time of the frame, a reference start time of the frame, and a number of elapsed frames; and
determining a current frame duration value based on the frame compensation value and the defined frame duration.

24. The non-transitory computer-readable medium of claim 23 wherein the contents comprise instructions executed by processing circuitry of the node.

25. The non-transitory computer-readable medium of claim 23 wherein the method comprises controlling a transmission time of a beacon by the node based on the current frame duration value.

* * * * *